United States Patent [19]

Izumisawa et al.

[11] Patent Number: 5,019,969
[45] Date of Patent: May 28, 1991

[54] COMPUTER SYSTEM FOR DIRECTLY TRANSFERRING VACTOR ELEMENTS FROM REGISTER TO REGISTER USING A SINGLE INSTRUCTION

[75] Inventors: Hiroyuki Izumisawa; Seiichiro Kinoshita, both of Tokyo, Japan

[73] Assignee: NEC Corporation, Tokyo, Japan

[21] Appl. No.: 751,112

[22] Filed: Jul. 2, 1985

[30] Foreign Application Priority Data

| Jul. 2, 1984 | [JP] | Japan | 59-136773 |
| Jul. 2, 1984 | [JP] | Japan | 59-136774 |
| Jul. 2, 1984 | [JP] | Japan | 59-136775 |
| Jul. 2, 1984 | [JP] | Japan | 59-136776 |

[51] Int. Cl.$^5$ .................. G06F 15/16; G06F 15/347; G06F 15/80; G06F 13/12
[52] U.S. Cl. .................. 364/200; 364/232.21; 364/238.7; 364/243; 364/274.4; 364/260.2; 364/926.2; 364/937.7; 364/931.51; 364/957.1; 364/964; 364/736
[58] Field of Search ........ 364/730, 736, 200 MS File, 364/900 MS File

[56] References Cited

U.S. PATENT DOCUMENTS

| 3,609,665 | 9/1971 | Kronies et al. | 364/200 |
| 4,128,880 | 5/1978 | Cray, Jr. | 364/200 |
| 4,293,941 | 10/1981 | Muraoka et al. | 364/200 |
| 4,296,465 | 10/1981 | Lemak | 364/200 |
| 4,490,786 | 12/1984 | Nakatani | 364/200 |
| 4,541,046 | 9/1985 | Nagashima et al. | 364/200 |
| 4,594,682 | 6/1986 | Drimak | 364/200 |
| 4,617,625 | 10/1986 | Nagashima et al. | 364/200 |
| 4,621,324 | 11/1986 | Ushiro et al. | 364/200 |
| 4,633,389 | 12/1986 | Tanaka et al. | 364/200 |
| 4,651,274 | 3/1987 | Omoda et al. | 364/200 |
| 4,680,730 | 7/1987 | Omoda et al. | 364/200 |
| 4,685,076 | 4/1987 | Yoshida | 364/200 |
| 4,697,235 | 9/1987 | Motegi | 364/200 |
| 4,712,175 | 12/1987 | Tonii et al. | 364/200 |
| 4,725,973 | 2/1988 | Matsuura et al. | 364/736 |
| 4,755,931 | 7/1988 | Abe | 364/200 |
| 4,760,545 | 7/1988 | Inagami et al. | 364/200 |
| 4,761,754 | 8/1988 | Kinoshita | 364/200 |
| 4,825,361 | 4/1989 | Omoda et al. | 364/200 |
| 4,910,667 | 3/1990 | Tanaka et al. | 364/200 |

Primary Examiner—Archie E. Williams, Jr.
Assistant Examiner—Ayni Mohamed
Attorney, Agent, or Firm—Sughrue, Mion, Zinn, Macpeak & Seas

[57] ABSTRACT

The movement of a set of element data in a computer is achieved by a plurality of vector registers and a moving unit which can move a set of element data from one vector register to another register in response to one instruction without going through either main memory or the functional units. A selector responds to the instruction to route the output from one register to the input of another and to also provide the appropriate read and write starting addresses.

8 Claims, 2 Drawing Sheets

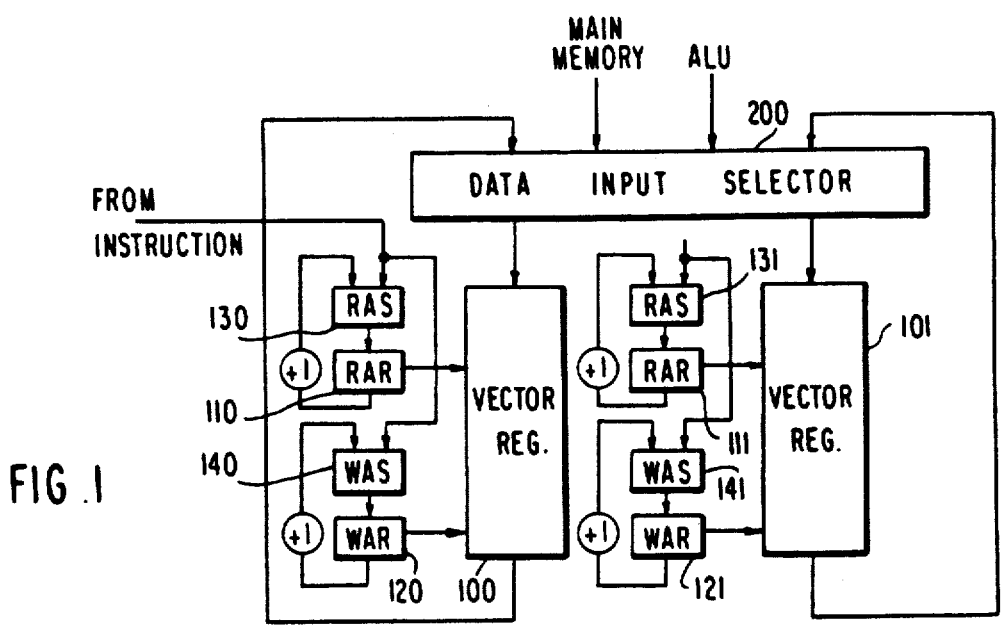
FIG. 1
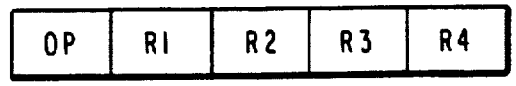
FIG. 2
FIG. 3
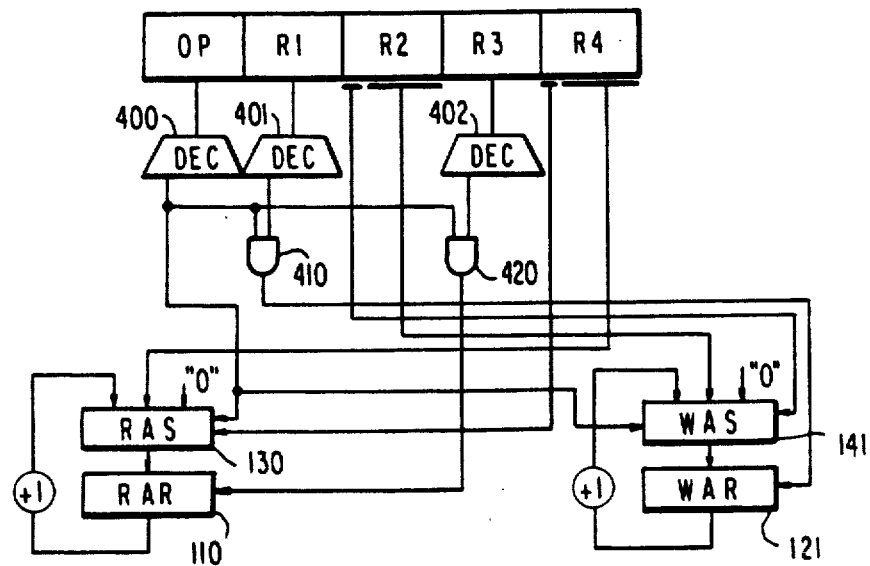

5,019,969

COMPUTER SYSTEM FOR DIRECTLY TRANSFERRING VACTOR ELEMENTS FROM REGISTER TO REGISTER USING A SINGLE INSTRUCTION

BACKGROUND OF THE INVENTION

The present invention relates to high speed digital processors, and more particularly to computing machines adapted for vector processing.

There are many circumstances in problem solving with computers where it is necessary to perform the same operation repetitively on each successive element of a set of data.

To solve such a problem one prior art technique provides vector processing apparatus for a computer, which allows the processing of a plurality of elements of an ordered set of data. Cray. Jr., et al in U.S. Pat. No. 4,128,880, describes an example of such vector processing apparatus. In this apparatus, referring to FIG. 2 of U.S. Pat. No. 4,128,880, vector processing in a computer is achieved by means of a plurality of vector registers 20 ($V_0$-$V_7$), a plurality of independent fully segmented vector functional units and means for controlling the operation of the vector registers, including fan-outs 22 and 23 for selecting a signal, a data path 21 and a memory 12. Each of vector registers $V_0$-$V_7$ has 64 individual elements, each of which can hold a 64 bit word. When the apparatus executes the partial vector processing of the element data in the vector register $V_0$, it is necessary to move at least one portion of the data in the register $V_0$ to another register $V_1$. To accomplish this movement, element data is moved between the vector registers $V_0$-$V_7$ and the memory 12 by store/-load instructions, or by a shift instruction. When moving by store/load instructions, element data in the register 20 are sequentially stored in the memory 12 via the fan-out 22 and data path 21 by store instructions, and a portion of the element data in the memory 12 are then loaded to the register $V_1$ via the fan-out 22.

When moving by shift instructions, the element data in the register $V_0$ is sent to the shift functional unit via the fan-out 23 by a shift instruction. The shift functional unit can perform a shift in accordance with a shift quantity designated by the instruction. The output of the shift functional unit is moved, shifted by one word, to the vector register $V_1$ via the fan-out 23. The desired movement of element data is accomplished by repeating this shift operation. Accordingly, since both techniques need either the memory 12 or the shift functional unit, the performance of element data movement becomes slow. In addition, when the next instruction needs the memory 12 and/or the shift functional unit, a conflict in using these devices has occurred.

SUMMARY OF THE INVENTION

It is, therefore, one object of the present invention to provide a computer, in which the movement of data element can be carried out without using the main storage or the functional operation units.

According to one feature of the present invention, there is provided a data processor comprising a first storing unit for storing a plurality of elements of an ordered set of data. A second storing unit can also store a plurality of elements of an ordered set of data. A moving unit moves the element data from the first storing unit to the second storing unit in response to the designation of one instruction.

BRIEF DESCRIPTION OF THE DRAWINGS

FIG. 1 is a diagram of a computer embodying the present invention;

FIG. 2 is an illustration of the format of the instruction used by the present invention;

FIGS. 3 and 4 are block diagrams for explanation of the addressing designated by the instruction of FIG. 2.

DESCRIPTION OF THE PREFERRED EMBODIMENT

Figure 4:
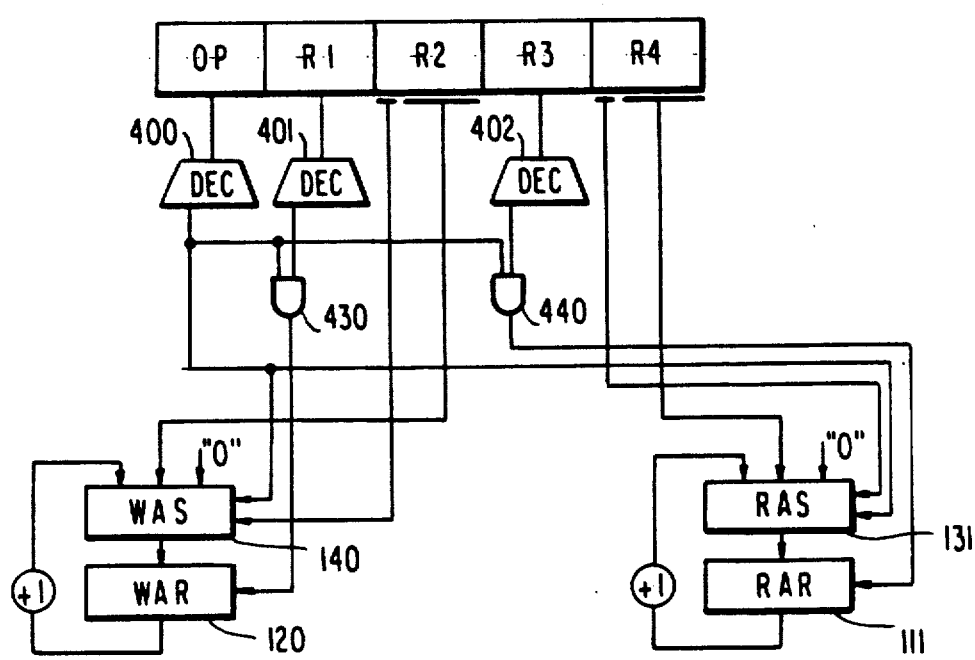

Referring to FIG. 1, a computer according to the present invention includes vector registers 100 and 101, read address registers 110 and 111, write address registers 120 and 121, read address selectors 130 and 131, write address selectors 140 and 141, and an input selector 200 for selecting input element data.

A plurality of vector registers, e.g., two vector registers 100 and 101 in this embodiment, hold a plurality of elements of an ordered set of data, respectively. Each of the registers 100 and 101 stores data loaded from a main storage or the result of an arithmetic operation from an ALU.

When the apparatus executes the partial vector processing of the element data in the vector register 100, it is necessary to move at least one set of the data in the register 100 to another register 101. In the operation of this case, the instruction shown in FIG. 2 is utilized.

An instruction will include the operation code (OP) and four operands R1, R2, R3 and R4. The operand R1 designates the destination vector register number, and the operand R3 designates the source vector register number. The operand R2 designates the write starting address of the destination vector register designated by the operand R1. If not necessary to designate the write starting address, it is not used. The operand R4 designates the read starting address of the source vector register designated by the operand R3. If not necessary, it is not used. The operation of designating a read starting address for the source vector address 100 is as follows.

Referring to FIG. 3, when the operation code is decoded as an element data move instruction, the operand R4 is sent to the address selector 130. When the operation code does not designate an element data move instruction, "0" is set into the selector 130. The output from the selector 130 is stored into a read address register 110 when the operation code designates the element data move instruction and the operand R3, i.e., the source vector register number, designates the vector register 100.

The operation of determining a write starting address for the destination vector register is as follows.

When the operation code designates an element data move instruction, the operand R2 is sent to the write address selector 141. When the operation code does not designate an element data move instruction, "0" is sent to the selector 141. The output from the selector 141 is stored into the write address register 121 when the operation code designates an element data move instruction and the operand R1, i.e., the destination vector register number, designates the vector register 101.

The operation of designating an element data move instruction which designates the vector register 101 as a source vector register number and the vector register 100 as a destination vector register number, will be described as follows. First, referring to FIG. 4, the operation of designating the read starting address for the source vector register will be explained.

When the operation code designates an element data move instruction, the operand R4 is sent into the read address selector 131. When the operation code does not designate a data move instruction, "0" is sent into the selector 131. The output from the selector 131 is stored into the read address register 111 when the operation code designates an element data move instruction and the operand R3, i.e., the source vector register number, designates the vector register 101.

The operation of designating the write starting address for the destination vector register is as follows.

When the operation code designates an element data move instruction, the operand R2 is sent to the write address selector 140. When the operation code does not designate a data move instruction, "0" is sent into the selector 140. The output from the selector 140 is stored into the write address register 120 when the operation code designates the element data move instruction and the operand R1, i.e., the destination vector register number, shows the vector register 100.

For example, the maximum number of element data capable of being stored in the vector registers 100 and 101 is 64. If 32 element data are moved from the vector register 100 to the register 101, the vector length register (not shown in the Figure) holds the vector length number "32" in accordance with an instruction indicating the vector length.

Referring to FIG. 1, according to the vector data movement instruction, the operand R3, representing the source vector register number designates the vector register 100, the operand R1, representing the destination vector register number, designates the vector register 101, and the operand R4, representing the read starting address for the vector register 100 designates the number "32". The read starting address designated by the instruction is given to read address selector 130. The address selected by the selector 130 is stored in the read address register 110. On the other hand, since the write starting address is not designated by the instruction, "0" is stored in the write address register 121 via the address selector 141. The vector register 100 sends the element data from the location of the register 100 designated by the address register 110 to the selector 200. The read address register 110 has a "1" increment function to read the element data in sequentially, and counts the location 33 following location 32. The element data stored in the vector register 100 is read out, and sent to the selector 200. The selector 200 selects the element data read out from the vector register 100 for input to the vector register 101. On the other hand, when the first element data is output from the selector 200 to the location of the vector register 101 designated by the contents of the write address register 121, the vector register 101 starts to store the element data. The write address register 121 has a "1" increment function for writing the element data in sequence like the read address register 110, and counts the location 1 following location 0. The element data is provided from the selector 200 to the location of the vector register 101 designated by the counted location. This operation is complete when the number of element data moved reaches "32", that is, the number is equal to the designated vector length.

Figure 5:
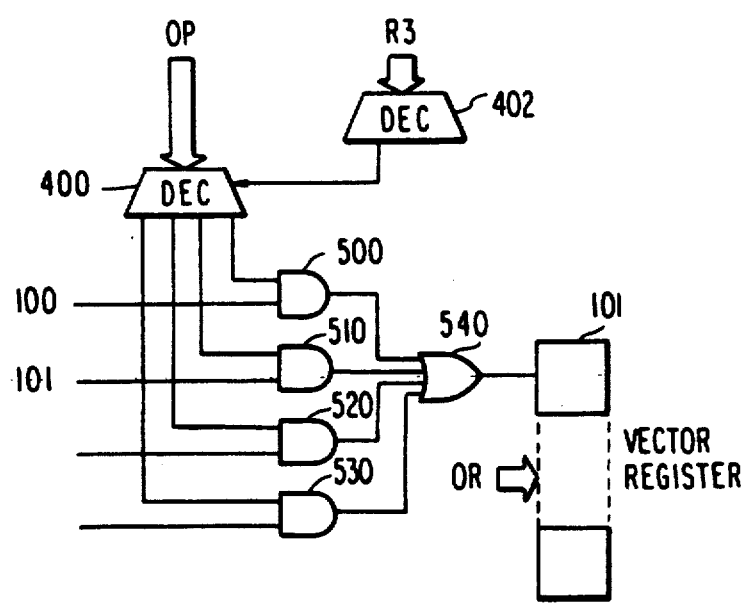
FIG. 5 is a portion of the detailed schematic diagram of the element data input selector 200 of FIG. 1.

An example of a portion of the element data input selector 200 is illustrated in FIG. 5. The operation code is provided to the decoder 400 and is judged as to whether or not the code designates an element data move instruction. The operand R3 is decoded by a decoder 402, and the decoded result designates the source vector register to a decoder 400. The gates 500, 510, 420, 530 and 540 select one of the outputs from vector registers 100 and 101, the main storage (not shown in the Figure) and the ALU (not shown in the Figure).

Next will be described a case wherein a vector length designation more than 64−(m−1) is used, where m is the read starting address of the source vector register. That is, the read address register 110 functions to count the number of the vector length designation in sequence so that the next location 0 is designated when the location of the vector register 100 is "63".

According to a different instruction, the source vector register number R3 designates the vector register 100, the destination vector register number R1 designates the vector register 101, and the write starting address R2 for the vector register 101 designates "32". As the read starting address is not designated by this instruction, "0" is stored into the read address register 110 via the read address selector 130. The number "32" designated by the instruction as a write starting address is stored into the write address register 121 via the write address selector 141. The read address register 110 has a "1" increment function. In response to the address from this register 110, the element data is read out from the location 0 of the vector register 100 in sequence, and is sent to the element data input selector 200. The write address register 121 also has a "1" increment function. The vector register 101 starts to store the element data as the element data is output from the location 0 of the vector register 100 via the selector 200. This operation is complete when the number of element data moved are "32", which is equal to the designated vector length. In the case that the designated vector length is more than "64−(m−1)", (where m designates the write starting address of the destination of movement of the element data), after the location of the vector register 101 shows "63", the write address register 121 functions to count "0" as a following location in the vector register 101, and to thereafter count the number of the vector length in sequence.

Next, a further example of data movement will be explained. Now, it is assumed that the source vector register number R3 shows the vector register 100, the destination vector register number R1 shows the vector register 101, the read starting address R4 of the vector register 100 shows "32", and the write starting address R2 of the vector register 101 shows "32" in the instruction. Since both of the read starting address and write starting address are designated by the instruction, the starting addresses "32" are stored into the read address register 110 and the write address register 121 via the read address selector 130 and the write address register 141, respectively. Since the read address register 110 has an increment function, the vector data is read out from the location 32 of vector register 100 designated by the content of the read address register 110 and is sent to the selector 200. Since the write address register 121 has an increment function, the element data from the selector 200 is stored into consecutive locations of the vector register 101 starting from the location 32 of the vector register 101.

This operation is completed when the number of element data moved is "32", which is equal to the designated vector length. The read address register 110 continues to count so that the value "0" follows "63" when the value of the vector length designated is greater than 64−(m−1), where "m" indicates the read starting address. In the same way, the write address register 121 continues to count so that the value "0" follows "63" when the value of the vector length designated is greater than 64−(n−1), where "n" indicates the write starting address.

Although it is assumed in this embodiment that the number of vector registers is two, the invention is not limited to a particular number of vector registers.

Furthermore, it is assumed in this embodiment that the source vector register for the movement of element data is the vector register 100, and the destination vector register for the movement of element data is the vector register 100. However, the scope of the present invention is not limited to the situation mentioned above, but the designation of vector registers is freely performed by the designation of the instruction.

The movement of the element data according to the present invention is carried out without going through the main storage or the shift functional unit, so that the performance of element data movement is improved.

It should be appreciated that a number of changes and modifications could be made to the embodiment described above without departing from the spirit and scope of the invention as defined in the appended claims. For example, although the implementation described above provides separate read address generation circuits for each of the two illustrated storage devices and similarly provides separate write address generation circuits for each of the storage devices, it would be a relatively straightforward matter to provide a single read address generation circuit which would always be loaded with the read start address and would then have its contents selectively gated to whichever one of the storage devices was designated by the instruction as the source register. A similar arrangement would be provided for the write address circuitry.

We claim:

1. Vector processing apparatus for a computer of the type which performs an operation in accordance with an instruction, said apparatus comprising:
   instruction receiving means for receiving an instruction from said computer;
   first storage means for storing a plurality of data elements;
   second storage means for storing a plurality of data elements;
   read addressing means responsive to said instruction received by said receiving means for providing read addresses to one of said first and second storage means for reading out data elements therefrom, wherein said read addressing means comprises:
      a read address register for providing said read addresses to said one storage means;
      incrementing means coupled to said read address register for incrementing the read address currently in said read address register to obtain an incremented read address;
      first means for providing a read start address; and
      read address selector means coupled to said incrementing means and coupled to said first means and responsive to said instruction for first providing said read start address and thereafter providing said incremented read address to said read address register, wherein said instruction includes a field containing said read start address, wherein said first means comprises means for providing a predetermined read start address and means for selectively providing one of said predetermined read start address and said address contained in said field of said instruction;
   said vector processing apparatus further comprising:
   write addressing means responsive to said instruction received by said receiving means for providing write addresses to the other of said first and second storage means for writing into said other storage means the data elements read out of said one storage means; and
   selector means coupled to inputs and outputs of both of said first and second storage means and responsive to said instruction for passing the output from said one storage means to the input of said other storage means.

2. A vector processing apparatus as claimed in claim 1, wherein said instruction includes a field designating said one of said first and second storage means as a source storage means, and wherein said read addressing means comprises means responsive to said field for selectively providing said read addresses to the storage means designated as said source storage means.

3. A vector processing apparatus as claimed in claim 2, wherein said read addressing means comprises:
   a first read address generation circuit for generating said read addresses for said first storage means when activated;
   a second read address generation circuit for generating said read addresses for said second storage means when activated; and
   read address control means controlled by said instruction for selectively activating one of said first and second read address generation circuits.

4. A vector processing apparatus as claimed in claim 1, wherein said selector means receives as first and second inputs the outputs from said first and second storage means, respectively, and receives a third input from a memory in said computer and a fourth input from a processing means in said computer, said selector means having output means coupled to said first and second storage means and being responsive to said instruction for selectively providing any one of its first through fourth inputs to the one of said first and second storage means designated by said instruction as a destination storage means.

5. A vector processing apparatus as claimed in claim 1, wherein said computer is of the type including a computer main memory, said first and second storage means being separate from said main memory.

6. A vector processing apparatus as claimed in claim 1, wherein said computer is of the type including at least one functional unit for processing data, and said reading of data elements out of said first storage means and writing of data elements into said second storage means is performed independently of any functional unit in said computer.

7. Vector processing apparatus for a computer of the type which performs an operation in accordance with an instruction, said apparatus comprising:
   instruction receiving means for receiving an instruction from said computer;

first storage means for storing a plurality of data elements;

second storage means for storing a plurality of data elements;

read addressing means responsive to said instruction received by said receiving means for providing read addresses to one of said first and second storage means for reading out data elements therefrom;

write addressing means responsive to said instruction received by said receiving means for providing write addresses to the other of said first and second storage means for writing into said other storage means the data elements read out of said one storage means, wherein said write addressing means comprises:
  a write address register for providing said write addresses to said other of said first and second storage means;
  incrementing means coupled to said write address register for incrementing the write address currently in said write address register to obtain an incremented write address;
  first means for providing a write start address; and
  write address selector means coupled to said first means and coupled to said incrementing means and responsive to said instruction for first providing said write start address and thereafter providing said incremented write address to said write address register;

said vector processing apparatus further comprising selector means coupled to inputs and outputs of both of said first and second storage means and responsive to said instruction for passing the output from said one storage means to the input of said other storage means, wherein said instruction includes a field containing said write start address and said first means comprises means for providing a predetermined write start address and means for selectively providing one of said predetermined write start address and said address contained in said field of said instruction.

8. Vector processing apparatus for a computer of the type which performs an operation in accordance with an instruction, said apparatus comprising:
  instruction receiving means for receiving an instruction from said computer;
  first storage means for storing a plurality of data elements;
  second storage means for storing a plurality of data elements;
  read addressing means responsive to said instruction received by said receiving means for providing read addresses to one of said first and second storage means for reading out data elements therefrom;
  write addressing means responsive to said instruction received by said receiving means for providing write addresses to the other of said first and second storage means for writing into said other storage means the data elements read out of said one storage means, wherein said instruction includes a field designating said one of said first and second storage means as a destination storage means, wherein said write addressing means comprises:
    means responsive to said field for selectively providing said write addresses to the storage means designated as said destination storage means;
    a first write address generation circuit for generating said write addresses for said first storage means when activated;
    a second write address generation circuit for generating said write addresses for said second storage means when activated; and
    write address control means controlled by said instruction for selectively activating one of said first and second write address generation circuits;
  wherein said vector processing apparatus further comprises selector means coupled to inputs and outputs of both of said first and second storage means and responsive to said instruction for passing the output from said one storage means to the input of said other storage means.

* * * * *

UNITED STATES PATENT AND TRADEMARK OFFICE
CERTIFICATE OF CORRECTION

PATENT NO. : 5,019,969

DATED : May 28, 1991

INVENTOR(S) : Hiroyuki Izumisawa et al.

It is certified that error appears in the above-identified patent and that said Letters Patent is hereby corrected as shown below:

Title Page:
In the title, delete "VACTOR" and insert --VECTOR--.

Column 1, line 3, delete "VACTOR" and insert --VECTOR--.

Signed and Sealed this

Eighth Day of December, 1992

Attest:

DOUGLAS B. COMER

Attesting Officer

Acting Commissioner of Patents and Trademarks